United States Patent [19]
Klingler

[11] Patent Number: 5,979,150
[45] Date of Patent: Nov. 9, 1999

[54] CONNECTION OF A SHEAR BAR TO SHEAR BAR SUPPORT OF A FORAGE HARVESTER

[75] Inventor: Alban Klingler, Gersheim, Germany

[73] Assignee: Deere & Company, Moline, Ill.

[21] Appl. No.: 09/132,603

[22] Filed: Aug. 11, 1998

[30] Foreign Application Priority Data

Aug. 16, 1997 [DE] Germany .......................... 197 35 698

[51] Int. Cl.⁶ .................................................. A01D 75/28
[52] U.S. Cl. .................................... 56/10.2 J; 56/16.4 A; 83/698.21; 248/562; 248/638; 30/276
[58] Field of Search ........................... 56/10.2 J, 16.4 R, 56/16.4 A; 248/562, 638; 30/276, 263, 264; 83/698.21

[56] References Cited

U.S. PATENT DOCUMENTS

| | | | |
|---|---|---|---|
| 3,874,605 | 4/1975 | Fleming | 241/292 |
| 4,198,006 | 4/1980 | Rolfe | 241/222 |
| 5,148,729 | 9/1992 | Krumdieck | 83/698.21 |
| 5,343,676 | 9/1994 | Weiss | 56/10.2 J |
| 5,444,966 | 8/1995 | Strosser et al. | 56/10.2 J |

FOREIGN PATENT DOCUMENTS

| | | | |
|---|---|---|---|
| 37 08 453 | 9/1988 | Germany . | |
| 405033828 | 2/1993 | Japan | 248/562 |
| 405231471 | 9/1993 | Japan | 248/562 |

OTHER PUBLICATIONS

Advertising Brochure "MEGA" Claas Company, publication No. 9/91 (GDS) dt–333/247.202.3 No Date.

Advertising Brochure "Self–propelled Forage Harvester" Mengele Company publication No. 5/1189/88–3 No Date.

*Primary Examiner*—Thomas B. Will
*Assistant Examiner*—Arpad Fabian Kovacs

[57] ABSTRACT

A shear bar support and/or a shear bar of a forage harvester is provided with a magnet acting on the respective opposite part. The magnet may be powered electrically and depending on an operation mode of the forage harvester. The magnet is located between the outer ends of the shear bar, which ends are fixed by bolts, and the like as is well known. The magnet acts to cause the shear bar to be pressed against the shear bar support in order to decrease or eliminate vibrations thereof.

7 Claims, 3 Drawing Sheets

5,979,150

CONNECTION OF A SHEAR BAR TO SHEAR BAR SUPPORT OF A FORAGE HARVESTER

BACKGROUND OF THE INVENTION

The present invention relates to a cornection of a shear bar to a shear bar support in a chopper arrangement of an agricultural machine, such as, for example, a forage harvester by means of fastening devices arranged in the outer regions of the shear bar or shear bar support, where the shear bar and/or the shear bar support consist of a magnetizable material, and concerns a shear bar or a shear bar support for such a connection and a machine.

Chopper arrangements are applied in particular in agricultural harvesting machines, such as forage harvesters. They contain a shear bar that interacts with the knives of a cutting arrangement in the form of a chopper drum for chopping crop, for example, for the production of silage material. Chopper arrangements may also be applied in garbage removal or in garbage recycling, in paper and textile manufacturing, in wood products and tobacco processing as well as in othe areas.

The advertising brochure "MEGA" of the CLAAS company, publication number 9/91 (GDS) dt-333/247.202.3, shows a conventional chopper arrangement in a forage harvester, in which a shear bar is secured by screws in its outer end regions on a shear bar support.

From the advertising brochure "Self-propelled Forage Harvester" of the Mengele Company, publication number 5/1189/88-3, a further variation for the securing of a shear bar on a shear bar support is known. Here, the shear bar is clamped to the shear bar support in its outer end regions by means of a special, spring-loaded retainer.

The two types of securing arrangements cited have in common the fact that the shear bars are fastened to the shear bar supports only in their outer regions or boundary regions. As a consequence, the shear bars are not fully in contact with the shear bar supports in their central regions, which can lead to a vibration of the shear bars during an operation of the chopper arrangement. Thereby, an abrasive wear of the shear bars and the shear bar supports.

SUMMARY OF THE INVENTION

According to the present invention there is provided an improved shear bar and shear bar support combination.

A broad object of the invention is to provide a shear bar and shear bar support combination which operates to eliminate vibration between the shear bar and the shear bar support.

A more specific object is to provide a shear bar and shear bar support of magnetizable material and wherein one contains one or more magnets for attracting the other is such a way as to reduce shear bar vibration during cutting operation.

Still another specific object is to provide a shear bar and shear bar support together with a magnet, as set forth in the immediately preceding object, wherein the magnet is an electromagnet controlled so as to be energized when the chopper drive is on or engaged, and de-energized when the chopper drive is off or disengaged and the forage harvester is only in transport operation, at a standstill or not in operation, whereby adjustment of the shear bar to maintain proper clearance with the chopper knife is not made against the high force of an energized electromagnet. Controlling the electromagnet in accordance with the operating condition of the forage harvester can be performed manually by means of a switching device, which can, for example, be arranged in the vehicle cab, or can be performed automatically by means of corresponding sensors which can detect the operating condition of the harvester and thereby, for example, determine whether or not the chopper drive is engaged.

These and other objects will become apparent from a reading of the ensuing description together with the appended drawings.

DESCRIPTION OF THE PREFERRED EMBODIMENT

Figure 1:
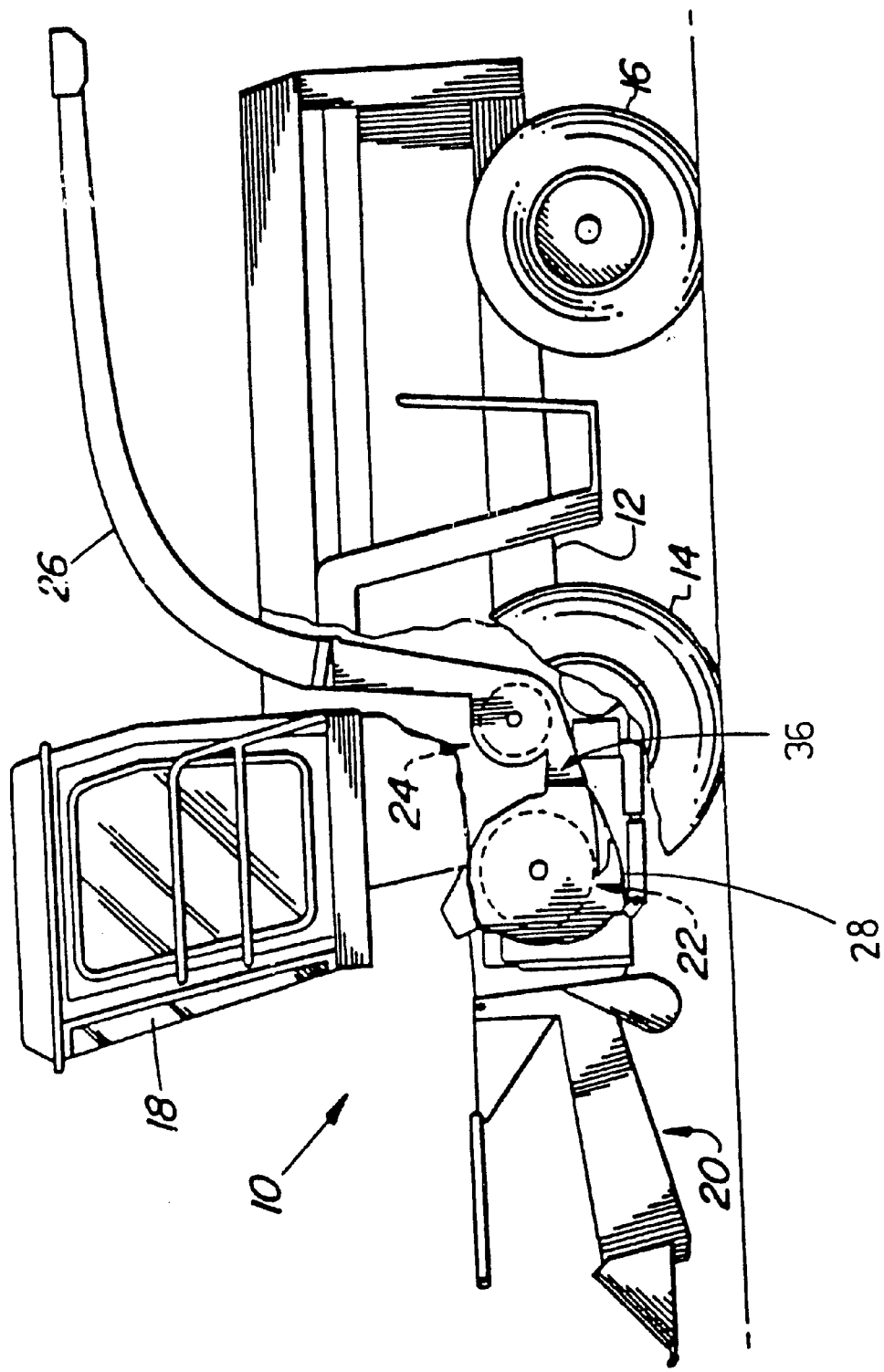
FIG. 1 shows a schematic side view of a machine with a chopper arrangement.

A machiine 10, shown in FIG. 1, in the form of self-propelled forage harvester, is built on a frame 12 that is supported on front and rear wheels 14 and 16. The operation of the machine 10 is controlled from an operator's cab 18 from which a crop recovery arrangement 20 can be visually observed. Crop picked up from the ground by the crop recovery arrangement 20, for example, corn, grass or the like is conducted to a chopper arrangement 22, described in further detail below, which chops crop into small pieces and transfers it to a conveyor in the form of a blower 24. The crop leaves the machine 10 to an accompanying trailer (not shown) through a discharge arrangement including a movable discharge pipe 26. Further details of the machine 10 are not described since these correspond to what is conventional in the art.

Figure 2:
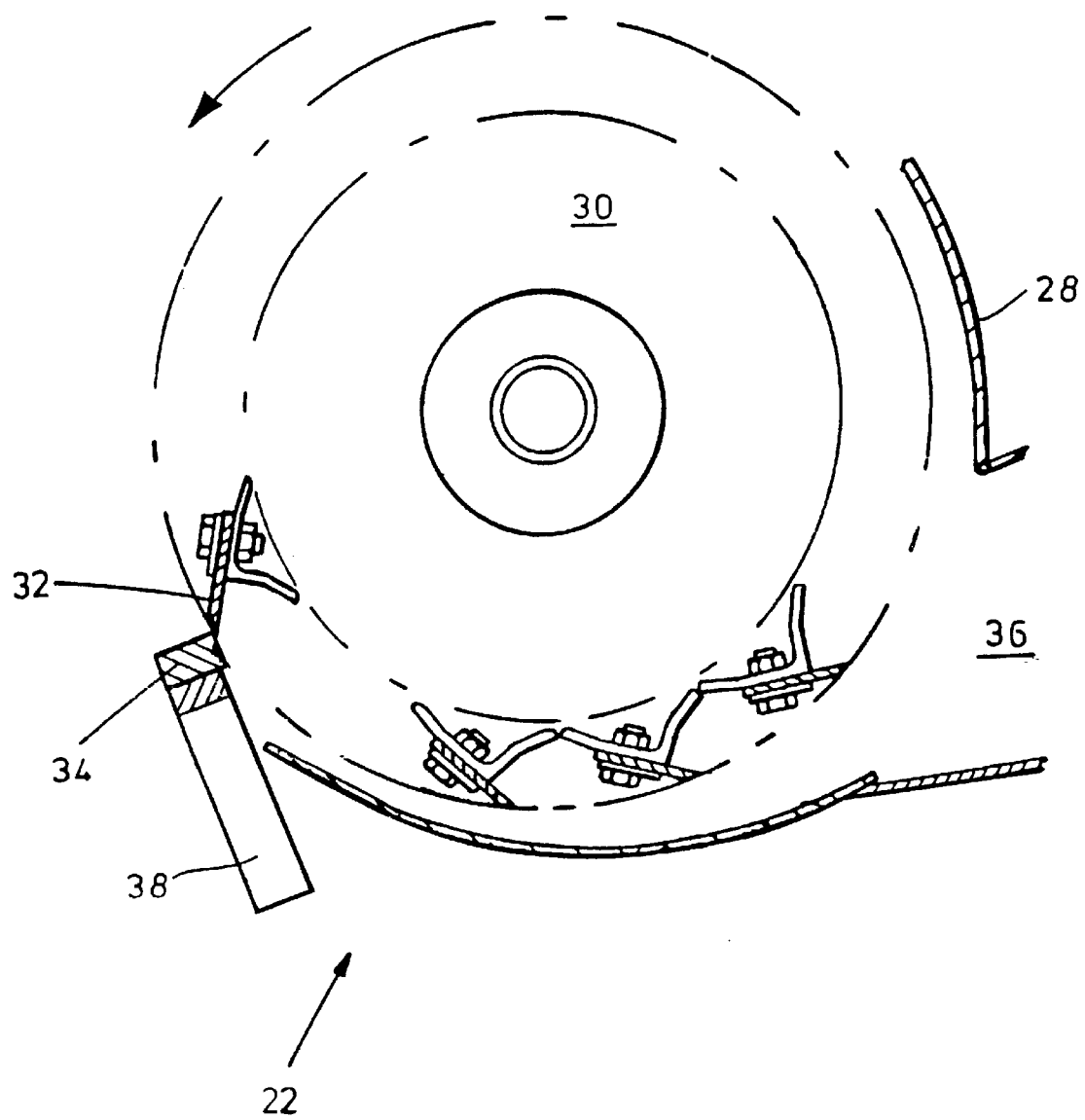
FIG. 2 shows an enlarged side view of the chopper arrangement with a shear bar and shear bar support.

According to FIG. 2, the chopper arrangement 22 consists of a housing 28, in which a chopper rotor 30 is arranged. The chopper rotor 30 is equipped on its circumference with a multitude of chopper knives 32, of which only a few are shown. These chopper knives 32 cut the crop supplied into small pieces against shear bar 34 and carry it along the circumference of the rotor 30 in the counterclockwise direction, as indicated by the arrow, until it can leave the housing 28 at an opening 36 and reach the blower 24.

Figure 3:
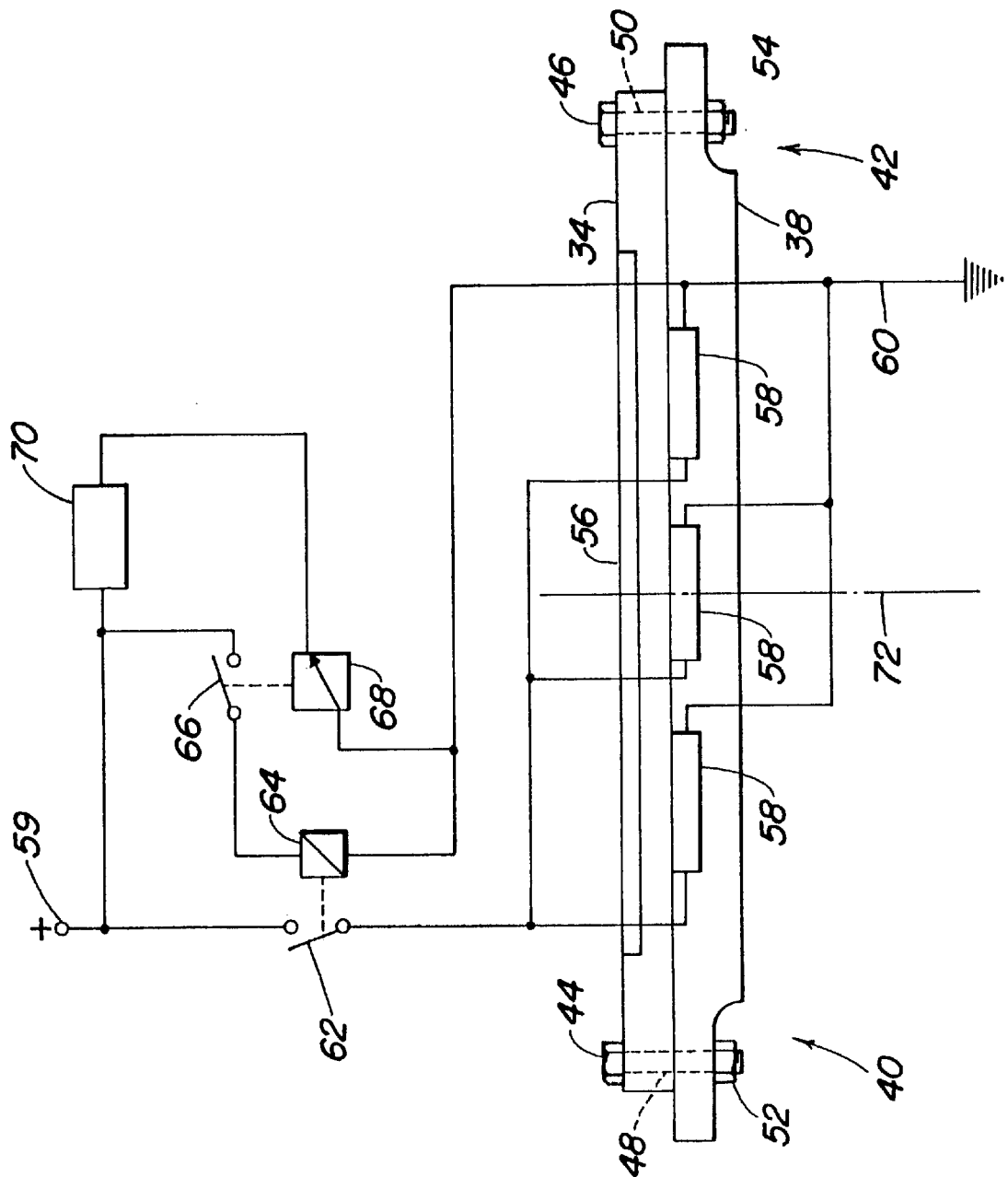
FIG. 3 shows an enlarged front view of the shear bar with a shear bar support, as well as a schematic diagram of the electrical circuit for controlling energization of the electromagnet arrangement.

As shown in FIG. 3, the shear bar 34 is in contact with a shear bar support 38 where at least the shear bar 34 is formed from magnetizable material. The shear bar 34 and the shear bar support 38 are connected to each other in their outer end regions 40, 42 so that they can be disconnected. In the embodiment shown, this is performed simply by means of two fasteners 44, 46 configured as screws that extend through bores 48, 50 in the shear bar 34 and the shear bar support 38. The fasteners 44, 46 are secured by nuts 52, 54. However, other connecting means are possible between the shear bar 34 and the shear bar support 38, for example, in the form of clamping arrangements or similar devices, as is adequately known. In a central or middle region 56 of the shear bar support 38, i.e., the region between the outer end regions 40 and 42 three identical magnets 58 with coils (not shown) are provided. The coils of the magnets 58 are respectively connected in parallel to a current source 59, for example, a vehicle battery, not shown, and the other ends of the coils of the magnets are connected to a grounding line 60. Furthermore, in this circuit, between the current source 59 and the magnets 58, a switch 62 is arranged that can be actuated by means of a relay 64 which is located in a second circuit. One end of the coil of the relay 64 is connected to the current source 59, by way of a switching device 66, here shown as being controlled by a second relay 68, and the other end of the coil of the relay 64 is connected to the grounding line 60. The second relay 68 includes a coil having one end coupled to a chopper condition sensing device 70 which monitors whether or not the drive for the chopper arrangement 22 is engaged, the sensor acting to complete a current path to the coil of the relay 68 only when the chopper arrangement is engaged. When the coil of the relay 68 is energized, it acts to close the switching device 66 so as to complete a current path to the coil of the relay 64 which in turn effects closure of the switch 62. It is rioted that instead of being controlled automatically by the chopper condition sensing device the switching device 66 could be manually actuated from the operator's cab 18. In any event, upon the switch 62 in the first circuit being closed, current flows in the coils of the magnets 58 so as to establish a magnetic pull therein.

The magnetic effect of the magnets 58 attracts the shear bar 34, which is manufactured from a magnetizable metal as is common, and thereby secures it in its central region 56 to the shear bar support 38 in addition to its attachment by the fastening devices 44, 46. Thereby a vibration of the shear bar 34 in its central region is prevented and consequently the wear of the shear beir 34 and the shear bar support 38 caused by the vibration is reduced or completely prevented.

By means of the switching device 66 in the second circuit, the flow of current through the magnets 58 can be permitted or prevented and thereby their magnetic effect can be switched on or off. During the harvesting operation of the machine 10, that is when the chopper drive is operating, among others (not shown) current flows through the coils of the magnets 58 and they operate as an electromagnet. If the machine 10 is not operating, that is, that the chopper drive, among others, is turned off, the flow of current is interrupted by an opening of the switching device 66 and thereby also the switch 62, and the magnets 58 loose their magnetic effect. In order to replace or readjust the shear bar 34, only the fastening devices 44 and 46 need to be released. An additional force to overcome the effect of the magnets 58 is not required.

The actuation of the switching device 66 can be performed manually by means of a rocker switch, not shown, arranged in the operator's cab 18. However, it is also possible that the control of the switching device 66 is performed automatically depending on the operating condition of the machine 10, that is, for example, whether the chopper drive, not shown, is turned on or off. For this purpose various operating data of the machine 10 are detected by the sensing device 70, for example, main drive "on/off", chopper drive "on/off", and processed in a vehicle computer, also not shown, form which the switching device 66 is controlled by way of the relay 68.

As an alternative design, it is possible to arrange fewer or more magnets in the shear bar support 38 in order to attain variations in area affected by the pulling force attracting the shear bar 34 to the support 38.

Forage harvesters are frequently equipped with metal detectors and, no matter what character the magnets 58 take, it is desirable that the effects of the magnetic force upon such a metal detector be minimized. This is done by arranging the magnet or magnets 58 symmetrically about a vertical center plane 72 of the shear bar 34 extending in the longitudinal direction of the vehicle. Accordingly, a single magnet 58 would be attached in a central region of the shear bar 34 or of the shear bar support 38 while a plurality of magnets 58 are preferably arranged symmetrically about the vertical center plane 70, as shown.

Alternatively, the magnets 58 can be arranged just in the shear bar 34, or in both the shear bar 34 and the shear bar support 38. Further, permanent magnets could be used in place of the electromagnets 58, with the control circuitry then being omitted, but the ability to de-energize the magnets with disengagement of the chopper arrangement 22 would be lost.

What is claimed:

1. In a forage harvester having a chopper arrangement including a shear bar secured at opposite end regions to a shear bar support and where at least one of said shear bar and shear bar support is constructed of a magnetizable material, and a chopper rotor mounted for rotating about a fixed axis and carrying a plurality of chopper blades for sweeping against said shear bar for chopping crop material fed across the shear bar toward said chopper rotor, the improvement comprising: a magnet means located for causing said shear bar to be attracted towards said shear bar support in a central region between said outer end regions with a force sufficient to minimize vibration of said shear bar against said shear bar support.

2. The forage harvester defined in claim 1 wherein said magnet means includes an electromagnet; and control means coupled to said electromagnet for energizing or deenergizing said electromagnet depending on an operating condition of said forage harvester.

3. The forage harvester defined in claim 1 wherein said magnet means is provided in said central region of one of said shear bar and shear bar support.

4. The forage harvester defined in claim 1 wherein said magnetic means comprises a plurality of magnets provided in one of said shear bar and shear bar support.

5. The forage harvester defined in claim 1 wherein said magnetic means is arranged symmetrically about a central plane of said shear bar located half way between said outer end regions.

6. In a crop harvesting machine including a chopper mounted for rotating about a central axis and having a plurality of blades arranged for sweeping against a shear bar for cutting crop into pieces as it passes over said shear bar, with the shear bar being mounted at its outer end regions to a shear bar support and with at least one of said shear bar and shear bar support being made of magnetizable material, the improvement comprising: magnetic means associated with said shear bar and shear bar support for creating a magnetic force acting to draw together respective middle regions of said shear bar and shear bar support with a force sufficient to minimize vibration of said shear bar relative to said shear bar support.

7. The crop harvesting machine defined in claim 6 wherein said magnetic means is so located relative to said middle regions that said magnetic force is symmetrical about a vertical plane extending cross ways to said shear bar and cutter bar support at a location midway between said outer end regions of said shear bar.

* * * * *

UNITED STATES PATENT AND TRADEMARK OFFICE
CERTIFICATE OF CORRECTION

PATENT NO. : 5,979,150
DATED : November 9, 1999
INVENTOR(S) : Alban Klingler

It is certified that error appears in the above-indentified patent and that said Letters Patent is hereby corrected as shown below:

Column 3, line 29, delete "beir" and insert -- bar --.

Column 4, line 62, delete "cutter" and insert -- shear --.

Signed and Sealed this

First Day of August, 2000

Attest:

Q. TODD DICKINSON

*Attesting Officer*  *Director of Patents and Trademarks*